United States Patent
MacGregor et al.

(10) Patent No.: US 6,465,101 B1
(45) Date of Patent: *Oct. 15, 2002

(54) MULTILAYER PLASTIC ARTICLES

(75) Inventors: Amy Kathleen MacGregor, Gansevoort; Donald George LeGrand, Burnt Hills; Sterling Bruce Brown, Schenectady, all of NY (US); Kenneth Lee Lilly, Evansville, IN (US)

(73) Assignee: General Electric Company, Niskayuna, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 46 days.

(21) Appl. No.: 09/067,341

(22) Filed: Apr. 28, 1998

(51) Int. Cl.$^7$ .................. B32B 27/36; B32B 27/06; C08L 67/02
(52) U.S. Cl. ............... 428/412; 428/480; 428/483; 525/175; 525/176; 525/177
(58) Field of Search ............... 428/412, 480, 428/483; 525/175, 176, 177

(56) References Cited

U.S. PATENT DOCUMENTS

| | | | |
|---|---|---|---|
| 5,204,418 A | * 4/1993 | Yasue et al. | 525/445 |
| 5,376,711 A | 12/1994 | Fujimoto et al. | 524/430 |
| 5,538,935 A | * 7/1996 | Hastreiter, Jr. et al. | 503/227 |
| 5,629,094 A | * 5/1997 | Sakakibara et al. | 428/447 |
| 5,773,517 A | * 6/1998 | Masuda et al. | 525/90 |
| 5,783,283 A | * 7/1998 | Klein et al. | 428/141 |

FOREIGN PATENT DOCUMENTS

| | | |
|---|---|---|
| EP | 0 488 544 A1 | 6/1992 |
| EP | 0 572 275 A1 | 12/1993 |
| EP | 05246948 | 4/1995 |
| EP | 0656 389 A1 | 6/1995 |
| JP | 870335599 | 12/1987 |
| JP | 07101028 | 4/1995 |
| JP | 1176556 | 12/1999 |

OTHER PUBLICATIONS

Gauthier, Michelle M., Engineered Materials Handbook, p. 49, Nov. 1995.*

* cited by examiner

*Primary Examiner*—Paul Thibodeau
*Assistant Examiner*—Holly C. Rickman
(74) *Attorney, Agent, or Firm*—S. Bruce Brown; Noreen C. Johnson

(57) ABSTRACT

Multilayer plastic composite articles comprise at least one poly (alkylene naphthalate) surface layer which is adherent to at least one surface of a substrate which is formed of a thermoplastic resin. Decorative layers can be located between the substrate and the poly (alkylene naphthalate) surface layers.

6 Claims, No Drawings

MULTILAYER PLASTIC ARTICLES

This invention is directed to multilayer plastic articles and methods for making such articles. More particularly the articles comprise a substrate or base layer of an injection molded or extruded thermoplastic and a layer of a polyalkylene napthalate, which can be a top or outer surface layer.

BACKGROUND OF THE INVENTION

There is substantial commercial interest in the use of plastic materials in various product forms such as sheet, film, shaped products, thermoformed articles, packaging, and architectural products. Many different plastics are used for such products in order to take advantage of particular physical, chemical, and mechanical properties.

SUMMARY OF THE INVENTION

Thermoplastic resin articles and structures are provided with a surface film which provides solvent resistance and other barrier properties, and which can be used to modify the color and appearance of the thermoplastic material. The surface film comprises a thin film of a polyalkylene naphthalate (PEN) which is applied to the thermoplastic substrate by lamination, coextrusion or by an in-mold process known in the art as "in-mold decoration" (IMD) in which the surface film is placed in the mold and the thermoplastic melt, which forms the substrate or base layer, is injection molded to the exposed surface or surfaces of the film.

The term "substrate", as used herein, refers to a structure such as a sheet or film which acts as the base or support for the polyalkylene naphthalate material which forms the outer layer or is one of a series of several layers. Generally, the substrate, although it can be a thin film, is relatively thick compared to the thickness of the coating.

The substrate or base layer to which the polyalkylene naphthalate film is applied can be any suitable thermoplastic resin including polycarbonates, polyesters, acrylonitrile/butadiene/styrene resins, referred to as ABS resins; and blends comprising polycarbonate in a mixture with one or more ABS resins or one or more polyesters, polyalkyleneesters, polyphenylene oxide-styrene resin blends, and the like. These resins are generally well known to and understood by those in the plastics and polymer arts, particularly the engineering plastic art.

In one embodiment of the invention a polyalkylene naphthalate layer can be laminated to or otherwise adhered to both sides, i.e., top and bottom of the injection molded substrate, thereby making a three-layer structure in which the substrate is protected on both sides by the same or different resin layers. Various intermediate layers can be applied for decorative or functional purposes.

The multilayer structures of this invention can be transparent, opaque, or translucent, as desired. Transparent products are preferred embodiments of this invention. The composite multilayer structure or article can also contain an intermediate bonding layer to improve its adhesion to the substrate.

The invention provides articles comprising a thermoplastic injection moldable substrate or base, preferably a polycarbonate resin, and at least one polyalkylene naphthalate surface layer. Both the base and surface layers can be provided as blends or with compatible functional additives.

DETAILED DESCRIPTION

Preferred polyalkylene naphthalates which are suitable for use in the present invention are those which are characterized by optical transparency, and increased barrier properties compared to polycarbonate alone, chemical resistance, high heat deflection temperatures and low water absorption.

Polyalkylene naphthalates useful in the practice of the invention are prepared by reaction of an alkylene glycol with a 2,6-naphthalene dicarboxylic acid (2,6-NDC) or an ester thereof.

The alkylene glycols useful in the preparation of the polyalkylene naphthalate resins for use as the surface films of the present invention are straight chain, branched, or cycloaliphatic, preferably straight chain or branched alkylene glycols, and may contain from 2 to 10 carbon atoms. Examples include, but are not limited to, ethylene glycol, propylene glycol, i.e., 1,2- and 1,3-propylene glycol, butane diol, i.e., 1,3- and 1,4-butane diol, diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol, triethylene glycol, 1,10-decane diol, and mixtures of any of the foregoing. Particularly preferred is ethylene glycol.

The diacids useful in the preparation of polyalkylene naphthalate resins of the present invention are naphthalenedicarboxylic acids. This is meant to include carboxylic acids having two carboxyl groups each of which is attached to a carbon on a ring or rings which may be unsaturated. A preferred diacid is 2,6-naphthalenedicarboxylic acid. Other acids include dicarboxylic acids adipic, oxalic, terephthalic, and isophthalic acids, decahydro naphthalene dicarboxylic acid, 2,7-naphthalene dicarboxylic acids, norbornene dicarboxylic acids, bicyclo octane dicarboxylic acids, diphenylether dicarboxylic acids and mixtures of any of the foregoing and all isomers thereof.

The poly(alkylene naphthalate) resins of the present invention are typically obtained through the condensation or ester interchange polymerization of the diol or diol equivalent component with the diacid or diacid chemical equivalent component and having recurring units of the formula:

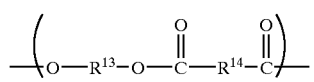

Formula 1 wherein $R^{13}$ represents an alkyl or cycloalkyl radical containing 2 to 12 carbon atoms and which is the residue of a straight chain, branched, or cycloaliphatic alkane diol having 2 to 12 carbon atoms or chemical equivalents thereof and $R^{14}$ is a naphthalene or a naphthalate radical which is the dicarboxylated residue derived from a diacid such as 2,6-naphthalenedicarboxylic acid.

A preferred poly(alkylene naphthalate) is poly(ethylene-2,6-naphthalate) (PEN) having recurring units of formula:

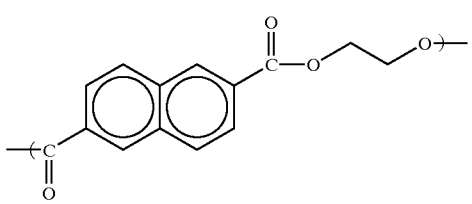

Formula 2

Blends comprising polycarbonate and poly (alkylene naphthalate) components form one class of resin compositions which can be used to form the top layer of the multilayer articles of this invention. Such blends may contain various additives such as compatibilization catalysts, impact modifiers, light stabilizers, ultraviolet absorbers, adhesion promoters and the like, in addition to catalyst quenchers. In general, the polycarbonate and the poly (alkylene naphthalate) resin, taken together, comprise from about 70% to about 100% by weight of the total composition, the ratio of the polycarbonate to the poly (alkylene naphthalate) resin being from about 10:90 to about 90:10.

A further preferred embodiment provides a composition wherein the polycarbonate is bisphenol-A polycarbonate and the polyester resin is derived from an alkyl diol and a naphthalene dicarboxylic acid. The preferred polyester resin being poly (ethylene-2,6-naphthalate) (PEN), and further, wherein the ratio of the polycarbonate to PEN is from about 0.01:99.99 to about 20:80.

Polycarbonate thermoplastic resins for use as the substrate in the production of the multilayer articles of the invention are thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.40 to 1.0 dl/g as measured in methylene chloride at 25° C. In one embodiment, the polycarbonates are derived from dihydric phenols and carbonate precursors.

Polycarbonates are a well-known class of high impact resistant thermoplastic resins characterized by optical clarity and high ductility. One of the most important engineering thermoplastics in use today is the polycarbonates. Polycarbonates can be defined as polymers containing recurring carbonate groups (—O—CO—O—) in the main chain. Aromatic polycarbonates are of particular interest in the practice of this invention. These polymers are known per se and are generally prepared by reacting a dihydric phenol with a carbonate precursor, e.g., phosgene, a halogen formate, or a carbonate ester.

Aromatic polycarbonates comprises multiple structural units represented by the formula:

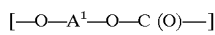

[—O—A$^1$—O—C (O)—]  Formula 3 wherein A$^1$ is a divalent aromatic hydrocarbon radical. Suitable aromatic hydrocarbon radicals for inclusion as A$^1$ include m-phenylene, p-phenylene, 4,4'-biphenylene, 4,4'-bis (3,5-dimethyl)-phenylene, 2,2-bis (4-phenylene)propane and similar radicals such as those which correspond to the dihydroxy-substituted aromatic hydrocarbons disclosed by name or formula in U.S. Pat. No. 4,217,438.

The A$^1$ radical preferably has the formula:

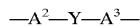

—A$^2$—Y—A$^3$—  Formula 4 wherein each of A$^2$ and A$^3$ is a mono cyclic divalent aromatic hydrocarbon radical and Y is a bridging hydrocarbon radical in which one or two atoms separate A$^2$ from A$^3$. The free valence bonds in formula IV are usually in the meta or para positions of A$^2$ and A$^3$ in relation to Y. The term "bisphenol" is sometimes used herein to designate the dihydroxy-substituted aromatic hydrocarbons; it should be understood, however, that non-bisphenol compounds of this type may also be employed as appropriate.

The A$^2$ and A$^3$ values may be unsubstituted phenylene or hydrocarbon-substituted or halo-derivatives thereof, illustrative substituents (one or more) being alkyl and alkenyl. Unsubstituted phenylene radicals are preferred. Both A$^2$ and A$^3$ are preferably p-phenylene, although both may be o- or m-phenylene or one o- or m-phenylene and the other p-phenylene.

The bridging radical, Y, is one in which one or two atoms, preferably one, separate A$^2$ from A$^3$. Illustrative radicals of this type are methylene, cyclohexylmethylene, 2-[2.2.1]-bicycloheptyl-methylene, ethylene, isopropylidene, neopentylidene, cyclohexyl-idene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred bisphenol is 2,2-bis(4-hydroxyphenyl)propane ("bisphenol A"), in which Y is isopropylidene and A$^2$ and A$^3$ are each p-phenylene.

Suitable polycarbonate resins for use in this invention are available from the GE Plastics component of General Electric Company under the trademark Lexan®.

The multilayer composites provided by this invention comprise a substrate or base layer of an thermoplastic resin such as a polycarbonate. Such blends can contain from about 1 to about 90, preferably about 1 to 10 weight percent polycarbonate and the balance PEN resin. The composite is characterized by other properties such as good barrier properties, low water absorption, chemical resistance, high heat deflection temperatures. It is moldable, printable, and can be cut without cracking.

Blends of polycarbonate and poly(alkylene naphthalate) can also be co-reacted to form a copolymer containing segments of both polycarbonate and poly (alkylene naphthalate). The copolymer may be predominantly a block copolymer of type A-B, A-B-A, etc., comprising alternating long segments of polycarbonate and poly(alkylene naphthalate), or the copolymer can be predominantly a random copolymer comprising short segments of polycarbonate and poly(alkylene naphthalate). A block copolymer is preferred. The block copolymer may be formed by transesterification through heating an intimate mixture of polycarbonate and poly(alkylene naphthalate) in a convenient mixing device. A catalyst may be present to promote transesterification. A catalyst may be added separately to the intimate blend of polycarbonate and polyester, or a catalyst may be present as a residue from polyester synthesis. Suitable catalysts include zerconates, titanates such as tetra alkyl zirconates and titanates. Tetrabutyl titanate is a preferred catalyst. Other suitable catalysts include dialkyltin compounds such as dibutyltin dilaurate, alkaline earth compounds, transition metal compounds and lanthanide compounds, and metal compounds. Illustrative catalysts include samarium acetylacetonate, samarium o-formyl phenolate, lanthanum acetylacetonate, aluminum acetylacetonate, barium acetylacetonate, zinc acetylacetonate, zinc acetate, strontium acetylacetonate, calcium acetylacetonate, cerium acetate, europium o-formyl phenolate, erbium nitrate/benzo-12-crown-4 complex, calcium acetate, antimony oxide or mixtures thereof. Other such transesterification catalysts to co-react the polycarbonate and polyester are well-known to those skilled in the art.

EXAMPLE 1

The PEN film was extruded under the conditions illustrated in Table 1.

TABLE 1

Kalidar ® PEN,

| | Extruder | | Die | | | Downstream | | |
|---|---|---|---|---|---|---|---|---|
| | Set | Actual | | Set | Actual | | Set | Actual |
| Zone 1 (° F.) | 510 | 513 | Left (° F.) | 540 | 538 | Roll Stack: | | |
| Zone 2 (° F.) | 520 | 517 | Middle(° F.) | 540 | 541 | Top (° F.) | 160 | 159 |
| Zone 3 (° F.) | 520 | 517 | Right (° F.) | 540 | 539 | Middle (° F.) | 140 | 141 |
| Zone 4 (° F.) | 540 | 540 | | | | Bottom (° F.) | 139 | 145 |
| Zone 5 (° F.) | 550 | 554 | | | | Line Speed (ft/min) | 10.4 | |
| Melt Temp (° F.) | 549* | | | | | | | |
| Pressure (psi) | fo | | | | | | | |
| RPMS | 30 | | | | | | | |
| Amps | 17 | | | | | | | |

*at extruder exit

After the film was made it was printed with a polyester based ink using a 230 mesh screen. A 4"×6" sample was cut and taped with Teflon® tape at one end to allow for a tab for adhesion testing once the printed film was laminated. The film was inserted into a mold of an injection molding machine set at the conditions listed in Table 2.

TABLE 2

Injection Molding Conditions for IMD Printed PEN Film
Injection Molding Conditions:

| | |
|---|---|
| Resin Melt Temps: | 570 F.–590 F. |
| Tool set Temps: | Moveable 175 F./Fixed 175 F. |
| Times: | |
| Inject | 10 sec. |
| Cool | 22 sec. |
| Cycle | 1 sec. |
| Injection Velocity | ~4.5 in./sec (ram) (75%) |
| Hold Pressure | 30% Mach. Cap. (625 psi) |
| Velocity to Pressure | |
| Switch Point | 10 mm |
| Shot Size | 42 mm |
| Cushion | 9 mm |
| Screw Speed | 80 rpm |
| Screw decompression | 1 mm |
| Screw Back Pressure | 0 |

The formed laminate was then tested in order to determine if it had adequate adhesion. Adequate adhesion is defined as greater than 10 lb./in using a 90 degree peel test. A one inch strip was cut from the center of the laminated part leaving a one inch tab at the top from the Teflon® tape. Using an Instron® equipped with tensile testing apparatus the adhesion was tested. Adhesion results for three samples are listed in Table 3.

TABLE 3

Adhesion Results for Three IMD Laminated Parts

| | Average Adhesion (lb/in) | STD | MAX |
|---|---|---|---|
| Sample 1 | 10.76 | 0.95 | 13.91 |
| Sample 2 | 10.68 | 0.89 | 12.55 |
| Sample 3 | 10.29 | 0.52 | 11.48 |

EXAMPLE 2

A 100% PEN film 0.010 in. thick was prepared. The extrusion conditions are listed in Table 4.

TABLE 4

Example of Film Extrusion Conditions for PEN Resin

| | |
|---|---|
| Extruder Diameter | 2 in. |
| Drying Temperature (° F.) | 320 |
| Drying Time (Hours) | 5 |

| Extruder Temperatures (° F.) | Set/Actual |
|---|---|
| Zone 1 | 510/513 |
| Zone 2 | 520/517 |
| Zone 3 | 520/517 |
| Zone 4 | 540/540 |
| Zone 5 | 550/554 |

| Pipes and Clamps Temperature (° F.) | |
|---|---|
| Melt Temperature (° F.) | 549 |
| Screw RPM | 30 |
| Extruder Amps | 17 |
| Line speed (fpm) | 10.4 |
| Die Lips (F) | 540 |
| Roll Stack Temp (° F.) | 141–159 |

The resulting film was optically transparent. After the film was prepared, the thickness, transmittance, YI, and haze were measured The results are shown in the table below. The transmittance, YI and haze were measured using a Gardner Colorimeter in the transmittance mode.

TABLE 5

Film Thickness, Transmittance, YI and Haze of the PEN film prepared.

| | Tansmittance | Yl | % Haze | Thickness (mil) |
|---|---|---|---|---|
| PEN Film | 88.1 | 2.2 | 1.8 | 10.3 |

In Mold Decorating:

The PEN film sample from the prior example was treated with Teflon tape on both sides for the first one inch along the width of a 4"×6" film. The film was then placed into the mold of an injection molding machine. Lexan, a PC/ABS blend or ABS was then injected into the mold to form a layered composite of a thermoplastic resin and the PEN film. The experimental conditions for the Nissei 160 ton press injection molder are shown in Table 6.

TABLE 6

Experimental Conditions for In Mold Decorating PEN Film
Injection Molding Conditions:

| Barrel set Temps: | |
| --- | --- |
| Nozzle | 590° F. |
| Front | 590° F. |
| Middle | 590° F. |
| Rear | 550° F. |
| Tool set Temps: | Moveable 190° F./Fixed 190° F. |
| Times: | |
| Inject | 10 sec. |
| Cool | 20 sec. |
| Cycle | 1 sec. |
| Injection Velocity | ~4.5 in./sec (ram) (75%) |
| Hold Pressure | 30% Mach. Cap. (625 psi) |
| Velocity to Pressure | |
| Switch Point | 10 mm |
| Shot Size | 42 mm |
| Cushion | 8 mm |
| Screw decompression | 1 mm |
| Screw Back Pressure | 0 |

Adhesion Testing:

Once the layered structure was made, the adhesion could be tested. A one inch wide adhesion test sample was cut from the plaque and mounted in a screw driven model 6025 Instron running Acquilin software. The Teflon flap provided a flap which could be easily grasped by the Instron which was used to perform 90 degree peel tests. The rate of peel was 0.0067 in/sec.

The adhesion test showed that the PEN adhesion was 1.14, 1.76, and 1.25 lb./in. to PC resin, PC/ABS and ABS resin respectively.

Oxygen ($TO_2$) Barrier and Water Vapor Transmission Rates (WVTR):

The PEN can be used to decrease the rate of oxygen or water transmittance through the film, while maintaining overall clarity and chemical resistance. Table 7 shows the relative performance of PC film to a PEN film to oxygen transmittance rates.

TABLE 7

Oxygen Transmittance Rates of PEN and PC Films

| Film material | WVTR grams * mils/100 in$^2$/day | $TO_2$ (73 F.) cc $O_2$ * mil/100 in$^2$/day |
| --- | --- | --- |
| PC | 12 | 219 |
| PEN | 0.5 | 0.8 |

Ink Adhesion/Diecutability

A PEN film was screen printed with a black ink made by Nazdar Company (Black, 9624). No adhesion promoters or surface treatments were used. The print adhesion was then tested by a crosshatch adhesion test (ASTM D3559) and was found to have a 5B rating.

The diecutting process involves stamping out the film into the shape of the mold. Failure is marked by hairline cracks along the edges or slivers of polymer along the cut surface, often referred to as 'angel hair' by those skilled in the art. The film was printed and cut according to accepted standards. No hair line cracks were observed.

EXAMPLE 3

Chemical Resistance

The film was tested for chemical resistance using a 50% ethyl acetate/50% methanol mixture using PC as a standard. The test was performed by placing a saturated piece of filter paper approximately 1" in diameter on the film. The sample was then covered with a watch glass to prevent evaporation. After 5, 15, 30, 45 and 60 minutes, the samples were checked for failure i.e. blistering. The table below shows the results of films performance.

TABLE 8

Results of Chemical Resistance Testing using a 50%
Ethyl Acetate/50% Methanol Mixture

| Material | Chemical Resistance |
| --- | --- |
| Lexan 125 | Failed @ 5 min. |
| PEN Film | Passed 60 min |

EXAMPLE 4

A 10 mil thick 90% PEN/10% PC film and a 10 mil thick 53%PEN/47% PC film were each extruded into film at 554° F. The resulting films were then in mold decorated to polycarbonate under conditions similar to those in Table 2, example 1. The adhesion was tested and found to be greater than 20 lb/in.

What is claimed:

1. A multilayer article comprising a substrate and an adherent layer, the substrate consisting essentially of a layer of a polycarbonate or an ABS resin or a blend of a polycarbonate with an ABS resin, and the adherent layer comprising a resin composition, wherein the resins of the composition consist of a polycarbonate-poly(alkylene naphthalate) blend or copolymer thereof, and the amount of polycarbonate in the polycarbonate-poly(alkylene naphthalate) blend or copolymer of the adherent layer is provided in a range from about 10 to about 90 percent by weight of the polycarbonate-poly(alkylene naphthalate) blend or copolymer.

2. An article according to claim 1 in which the polycarbonate of the substrate and the adherent layer is bisphenol-A polycarbonate.

3. An article according to claim 1 in which the resins of the adherent layer consist of bisphenol-A polycarbonate and a poly(ethylene naphthalate), or a copolymer thereof.

4. A multilayer article comprising a substrate and an adherent layer, the substrate consisting essentially of a layer of a polycarbonate or an ABS resin or a blend of a polycarbonate with an ABS resin, and the adherent layer comprising a resin composition, wherein the resins of the composition consist of a polycarbonate-poly(alkylene naphthalate) blend or copolymer thereof, and ethylene vinyl acetate, and the amount of polycarbonate in the polycarbonate-poly(alkylene naphthalate) blend or copolymer of the adherent layer is provided in a range from about 10 to about 90 percent by weight of the polycarbonate-poly (alkylene naphthalate) blend or copolymer.

5. An article according to claim 4 in which the polycarbonate of the substrate and the adherent layer is bisphenol-A polycarbonate.

6. An article according to claim 4 in which the resins of the adherent layer consist of (i) bisphenol-A polycarbonate and poly(ethylene naphthalate), or a copolymer thereof, and (ii) ethylene vinyl acetate.

* * * * *